(12) United States Patent
Akizuki et al.

(10) Patent No.: US 7,383,467 B2
(45) Date of Patent: Jun. 3, 2008

(54) INFORMATION PROCESSING APPARATUS HAVING COMMAND-RETRY VERIFICATION FUNCTION, AND COMMAND RETRY METHOD

(75) Inventors: Yasunobu Akizuki, Kawasaki (JP); Norihito Gomyo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 579 days.

(21) Appl. No.: 10/986,152

(22) Filed: Nov. 12, 2004

(65) Prior Publication Data

US 2006/0026461 A1 Feb. 2, 2006

(30) Foreign Application Priority Data

Jul. 29, 2004 (JP) .............................. 2004-222400

(51) Int. Cl.
*G06F 11/00* (2006.01)

(52) U.S. Cl. ...................... 714/21; 714/17; 712/227

(58) Field of Classification Search ............... 714/17, 714/21; 717/227; 712/227
See application file for complete search history.

(56) References Cited

U.S. PATENT DOCUMENTS

| 5,321,698 | A | * | 6/1994 | Nguyen et al. ................ 714/17 |
| 5,386,549 | A | * | 1/1995 | Norrie et al. ................. 714/15 |
| 2001/0025338 | A1 | * | 9/2001 | Zumkehr et al. ............ 712/228 |
| 2004/0006684 | A1 | * | 1/2004 | Akizuki et al. .............. 712/217 |

FOREIGN PATENT DOCUMENTS

| JP | 49-65156 | 6/1974 |
| JP | 57-33496 | 2/1982 |
| JP | 58-39351 | 3/1983 |
| JP | 59-22147 | 2/1984 |
| JP | 62-6353 | 1/1987 |
| JP | 62-92042 | 4/1987 |
| JP | 64-082140 | 3/1989 |
| JP | 5-151104 | 6/1993 |

* cited by examiner

*Primary Examiner*—Emerson C Puente
(74) *Attorney, Agent, or Firm*—Staas & Halsey LLP

(57) ABSTRACT

A parity generating circuit reverses generated parity data to detect a parity error of a CSE entry during a determination of completion to execute a command retry. A parity check circuit that detects a parity error requests for the execution of the command retry. When a command retry mechanism stops a program and interrupts a verification, the execution of the command retry is suppressed by assuming that no parity error is detected.

9 Claims, 7 Drawing Sheets

ENTRY NUMBER OF ENTRY IN WHICH COMMAND IS
TO BE COMPLETED IN NEXT CYCLE

INFORMATION PROCESSING APPARATUS HAVING COMMAND-RETRY VERIFICATION FUNCTION, AND COMMAND RETRY METHOD

BACKGROUND OF THE INVENTION

1) Field of the Invention

The present invention relates to an information processing apparatus having a command retry mechanism of retrying a command upon occurrence of an abnormality and a command-retry verification method, and more particularly, an information processing apparatus capable of verifying operation by repeatedly executing a command retry, thereby capable of improving quality of the command-retry function and a command-retry verification method.

2) Description of the Related Art

Conventionally, the information processing apparatus has a function called an RAS standing for securing reliability, availability, and serviceability.

The command-retry function, as a part of the RAS function, is for retrying a command to normally operate the information processing apparatus without stopping a program, when a trouble occurs in a part of circuits during the operation of the apparatus (see, for example, Japanese Patent Application Laid-open No. S58-39351).

However, according to the command-retry function, the operation cannot be verified sufficiently because there is timing when the command cannot be retried and the command-retry function cannot be repeatedly achieved. When the command-retry function operates during the timing that the command cannot be retried, the program is halted, and subsequent verification of operation cannot be performed.

SUMMARY OF THE INVENTION

It is an object of the present invention to solve at least the above problems in the conventional technology.

An information processing apparatus according to one aspect of the present invention includes a command retry mechanism that retries a command when an abnormality occurs; a commit stack entry that holds information concerning commands to be executed out of order in an order of an original order to control the order of completing the commands; a state setting unit that sets a state of the information processing apparatus to either of a normal state for a normal operation and a verification state for an operation verification; an entry registering unit that tampers, when the information processing apparatus is in a verification state, the contents of information concerning a command to be registered to the commit stack entry, and registers the information in a state of detecting a parity error; and a completion determining unit that performs a determination of completion and a parity check of an entry of a command of which execution has a possibility of being completed in a corresponding cycle from among the entries of the commit stack entry, and when a parity error is detected in any one of the entries, requests the command retry mechanism to retry commands starting from the oldest command registered in the commit stack entry.

A command-retry verification method according to another aspect of the present invention, which is for an information processing apparatus including a command retry mechanism that retries a command when an abnormality occurs and a commit stack entry that holds information concerning commands to be executed out of order in an order of an original order to control the order of completing the commands, includes registering the information in a state of detecting a parity error by tampering, when the information processing apparatus is in a verification state, the contents of information concerning a command to be registered to the commit stack entry; registering, when the information processing apparatus is in a verification state, data of a parity error to the commit stack entry; performing a determination of completion and a parity check of an entry of a command of which execution has a possibility of being completed in a corresponding cycle from among the entries of the commit stack entry; and requesting, when a parity error is detected in any one of the entries, the command retry mechanism to retry commands starting from the oldest command registered in the commit stack entry.

The other objects, features, and advantages of the present invention are specifically set forth in or will become apparent from the following detailed description of the invention when read in conjunction with the accompanying drawings.

DETAILED DESCRIPTION

Exemplary embodiments of an information processing apparatus and a command-retry verification method according to the present invention will be explained in detail with reference to the accompanying drawings.

Figure 1:
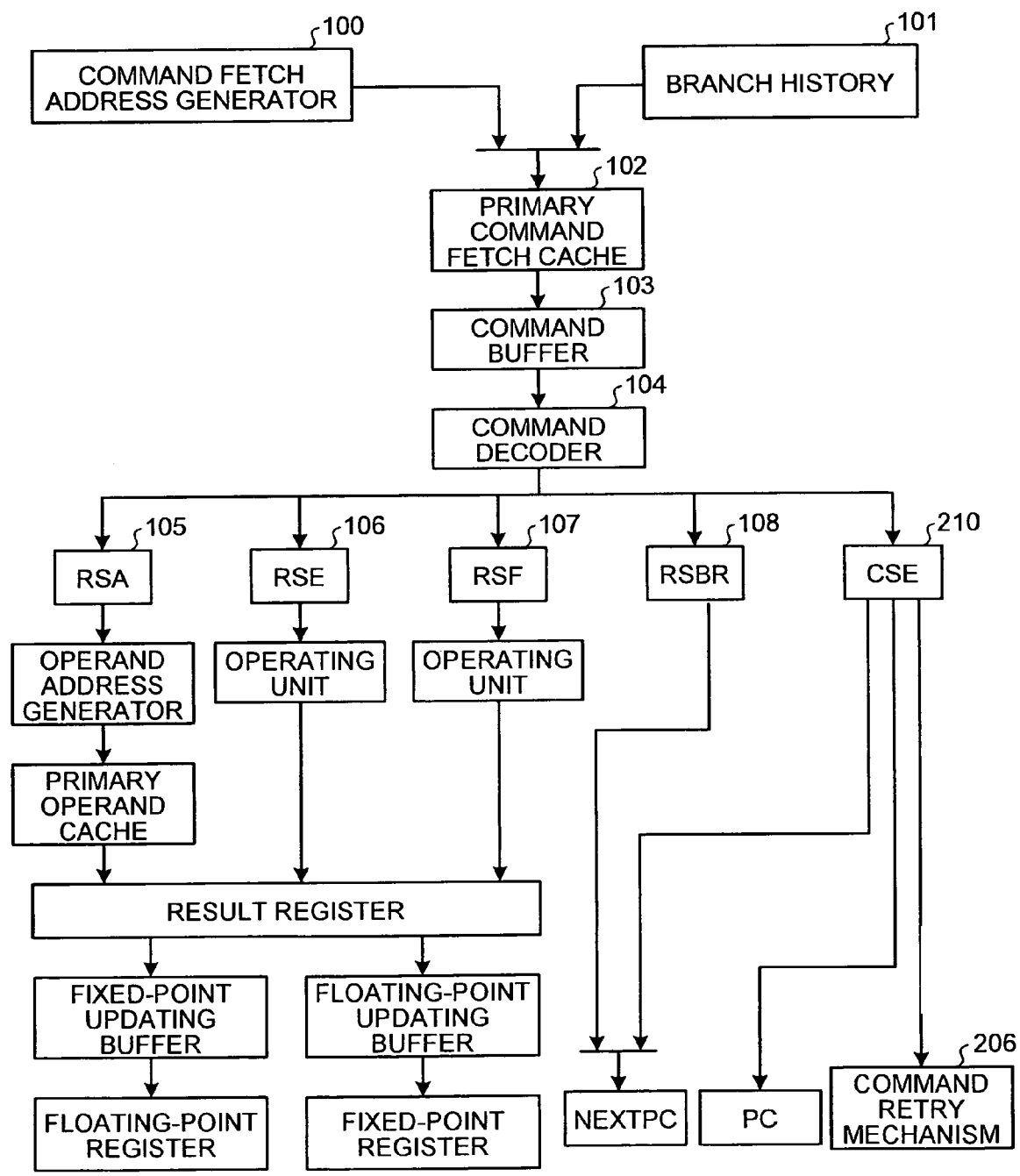
FIG. 1 is a block diagram of an outline of the whole information processing apparatus according to the present embodiment.

FIG. 1 is a block diagram of the outline of the whole information processing apparatus according to the present embodiment. As shown in FIG. 1, in the information processing apparatus according to the present embodiment, an information fetch address generator 100 or a branch history 101 instructs to read commands from a primary fetch cache 102. A command buffer 103 temporarily holds the command, and a command decoder 104 decodes the commands in order.

The decoded commands are allocated to an address generation reservation station (RSA) 105, an integer operation reservation station (RSE) 106, a floating-point operation reservation station (RSF) 107, or a branch reservation station (RSBR) 108 according to kinds of commands, and are executed out or order.

Pieces of information concerning the decoded commands are also sent to a CSE 210. The CSE 210 holds in order pieces of information concerning states of executing the commands at the respective reservation stations, and controls completion of the commands.

Figure 2:
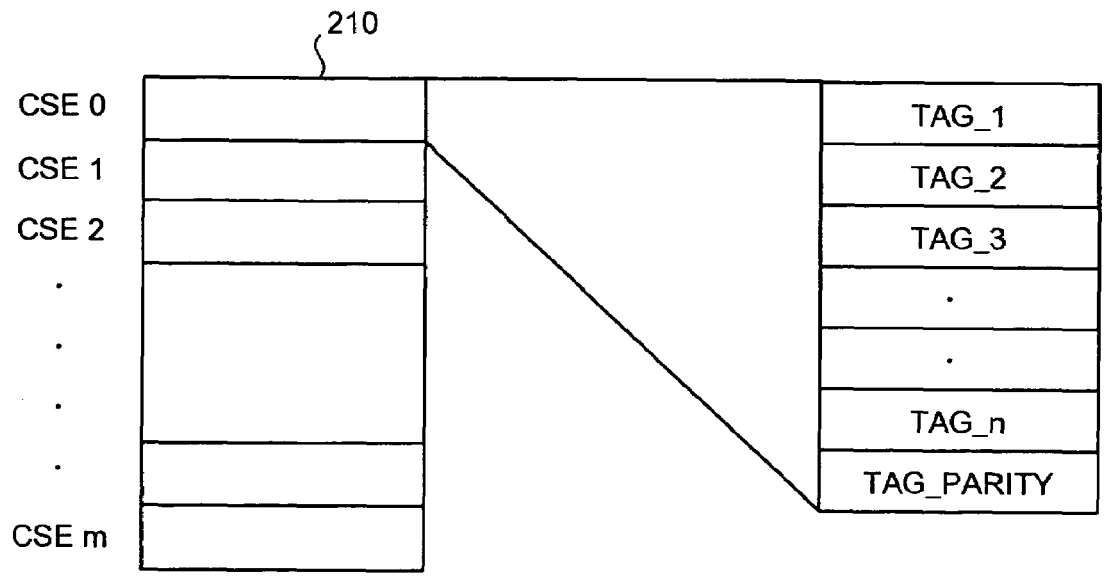
FIG. 2 is an explanatory diagram of a configuration of a commit stack entry (CSE)

FIG. 2 is an explanatory diagram of a configuration of the CSE 210. As shown in FIG. 2, the CSE 210 creates an entry for each command decoded by the command decoder 104. Each entry includes a parity bit for detecting an error in a signal and data transmitted from the command decoder 104.

Figure 3:
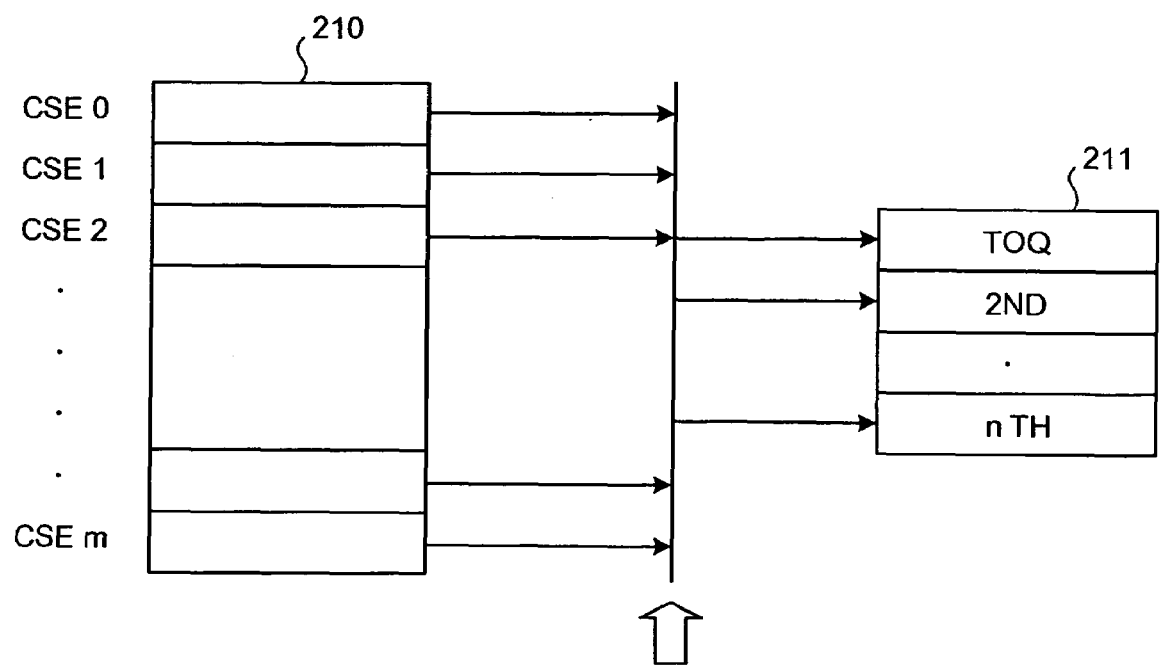
FIG. 3 is an explanatory diagram of a completion determination operation using the CSE.

FIG. 3 is an explanatory diagram of a completion determination operation using the CSE 210. As shown in FIG. 3, the CSE 210 selects an entry of a command that has a possibility of being completed in the next cycle, and registers the entry of a completion target entry 211. A completion determination circuit 204 to be explained later determines completion of a determination in each entry of the completion target entry 211. Resources for each completed command, such as a program counter and a register, are updated, and the entry of the CSE 210 is released.

When a parity error is detected in any one of the entries at the time of a completion determination, a command retry mechanism 206 executes a command retry to retry a fetching of commands to be completed in the corresponding cycle starting from the oldest command. According to the information processing apparatus and the command-retry verification method according to the present embodiment, command retry is verified using this mechanism of the command retry of the CSE 21.

Figure 4:
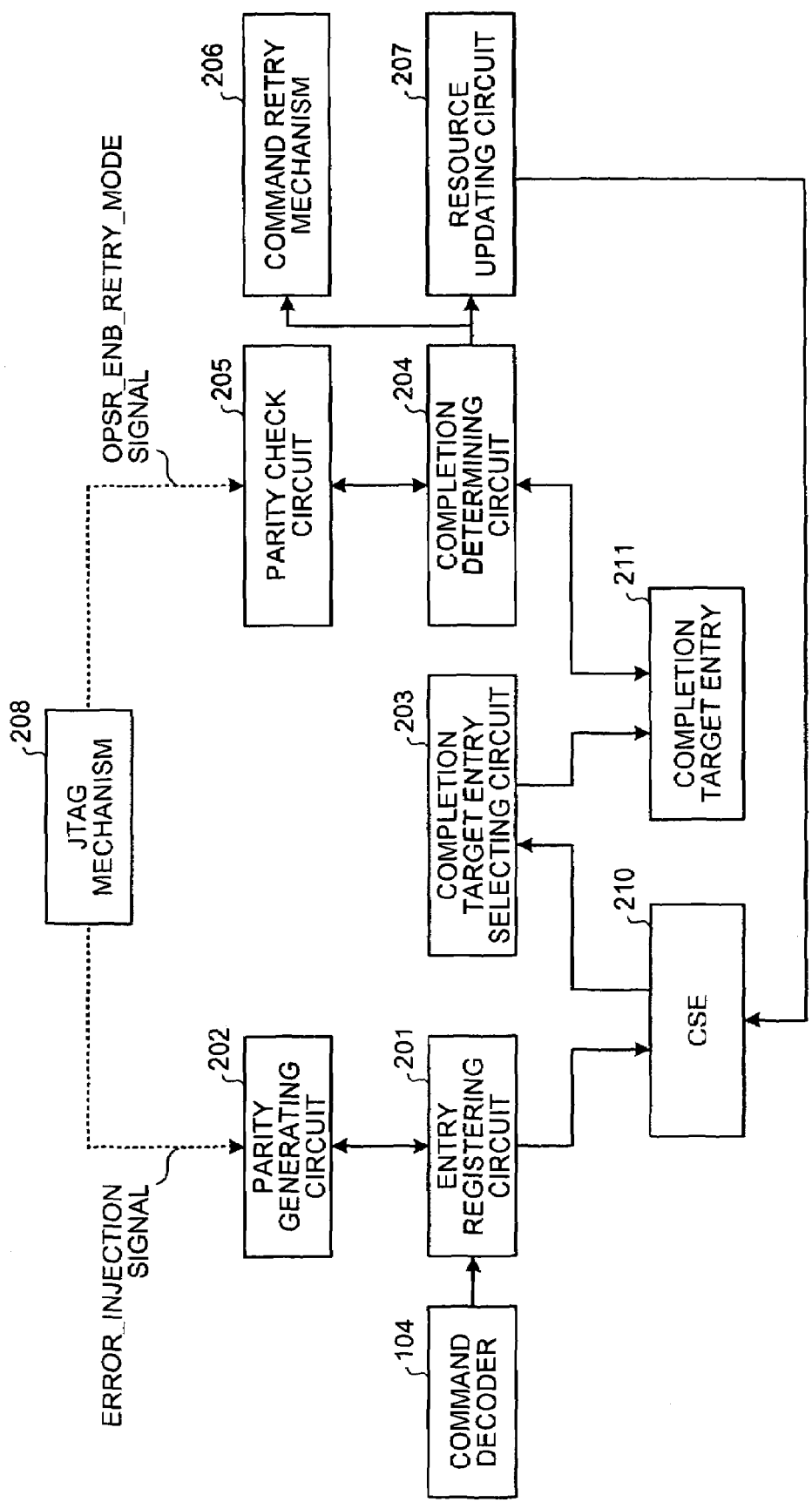
FIG. 4 is a block diagram of a configuration of a unit related to a command-retry verification system according to the present embodiment.

FIG. 4 is a block diagram of a configuration of a unit related to the command-retry verification system according to the present embodiment.

As explained above, the command decoder 104 decodes in order the commands read from the primary command fetch cache 102, and allocates the decoded commands to the reservation stations according to kinds of commands. The command decoder 104 sends information concerning the decoded commands to an entry registering circuit 201 in order to control completion of the decoded commands.

The entry registering circuit 201 registers the information transmitted from the command decoder 104 to the entries of the CSE 290. The entry registering circuit 201 adds parity data to detect a data error, to the information, in registering the information to the entries of the CSE 290.

A parity generating circuit 202 generates parity data that the entry registering circuit 201 adds. The parity generating circuit 202 changes the generated parity data according to a state of and ERROR_INJECTION signal from a Joint Test Action Group (JTAG) mechanism 208.

Figure 5:
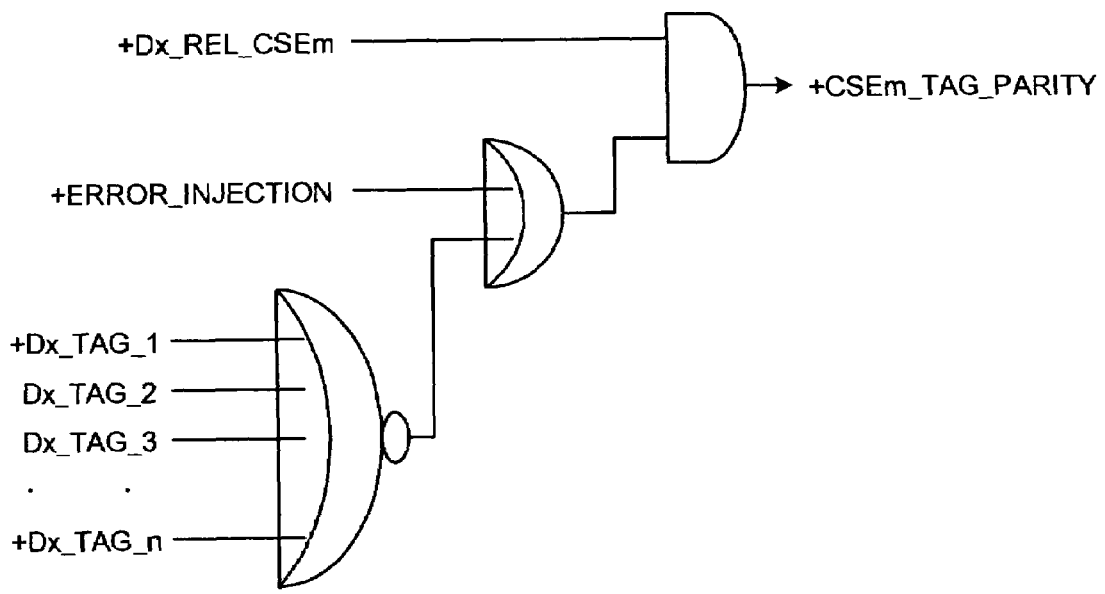
FIG. 5 is a block diagram of a configuration of a parity generating circuit.

FIG. 5 is a block diagram of a configuration of the parity generating circuit 202. As shown in FIG. 5, 1-bit parity data that is generated from signals Dx_TAG_1 to Dx_TAG_n transmitted from the command decoder 104 is sent to the entry of the CSE corresponding to a Dx_REL_CSEm signal at a moment when the signal is set on when the ERROR_INJECTION signal is off.

On the other hand, when the ERROR_INJECTION signal is on, an EOR circuit reverses and sends out the 1-bit parity data that is generated from the signals Dx_TAG_1 to Dx_TAG_n. The reversed parity data makes a parity error detected at the time of determining a command completion, and makes a command retry generated.

As explained above, the command-retry verification system according to the present embodiment makes the parity generating circuit 202 generate reversed parity data at the time of verifying the operation of the command retry, thereby intentionally detecting a parity error and generating a command retry. When detection of a parity error is carried out just for the purpose of generating a command retry, data other than the parity data can be changed. However, the changing of data other than the parity data affects the operation of the information processing apparatus. Therefore, only the parity data is reversed.

A completion target entry selecting circuit 203 selects an entry that stores information about a command having a possibility of being completed in the next cycle from the CSE 210, and transcribes the entry to the completion target entry 211. The entry transcribed to the completion target entry 211 becomes a subject of which completion is to be determined by the completion determining circuit 204.

The completion determining circuit 204 determines whether a command corresponding to each entry of the completion target entry 211 is completed. The completion determining circuit 204 carries out a parity check of the information that is set to the entry, in determining a completion. When a parity error is detected in a certain entry, the completion determining circuit 204 stops a completion determination, and notifies the command retry mechanism 206 about the occurrence of the parity error in the CSE 210.

The parity check circuit 205 checks a parity in each entry of the completion target entry 211. When the parity check circuit 205 detects a parity error, the completion determining circuit 204 notifies the command retry mechanism 206 about the occurrence of the error so that the command retry mechanism 206 carries out the command retry.

In verifying the operation of a command retry, reversed parity data is registered to the completion target entry 211 as described above. During the verification of the operation of the command retry, a parity error can be detected in any cycle when the entry of the CSE 210 is valid, and the command retry is carried out. However, this operation has a problem.

Since there is timing when the command retry cannot be carried out, a command retry cannot be executed at any time. When an attempt is made to carry out a command retry at the timing, the command retry mechanism 206 stops the program, and makes it impossible to continue the verification of the operation of the command retry.

Two examples of timing when the command retry cannot be carried out are explained below. One example is when a multi-flow command is the oldest command in the completion target entry 211. The multi-flow command is one command that is divided into a plurality of flows. The multi-flow command requires an entry of the CSE 210 for each flow. Only one flow of command can be completed in one cycle. When the oldest command in the completion target entry 211 is a multi-flow command, this command may be one that is a flow of the multi-flow command in progress. When an attempt is made to carry out a command retry at this timing, the retry is started from the first flow again. Because the same flow is completed repeatedly, an abnormality occurs in the program, which makes it impossible to carry out the command retry.

Another example is when a command in the middle of a non-cache access is present in the entry of the CSE 210. When a command retry is carried out during a non-cache access and when the non-cache access is made with the same command again, loaded data may be different in some cases. In this case, the command retry cannot be carried out.

In the retry verification system according to the present embodiment, the parity check circuit 205 does not detect a parity error when a command retry cannot be carried out during the verification of the operation of the command retry. When a parity error is not detected, a completion determination is made or a completed command is released as usual, without stopping the program.

As explained above, when the command retry cannot be carried out, by making a parity error not detected, the interruption of a verification work due to a program stop can be avoided.

During timing other than the verification of the operation of the command retry, the retry verification system makes the parity check circuit 205 detect a parity error, and requests the command retry mechanism to retry commands, even when the command retry cannot be carried out. The command retry mechanism determines whether to carry out the command retry. This is because when a certain trouble actually occurs and a parity error also occurs, it is hazardous to continue the processing in the state of the occurrence of the trouble.

Figure 6:
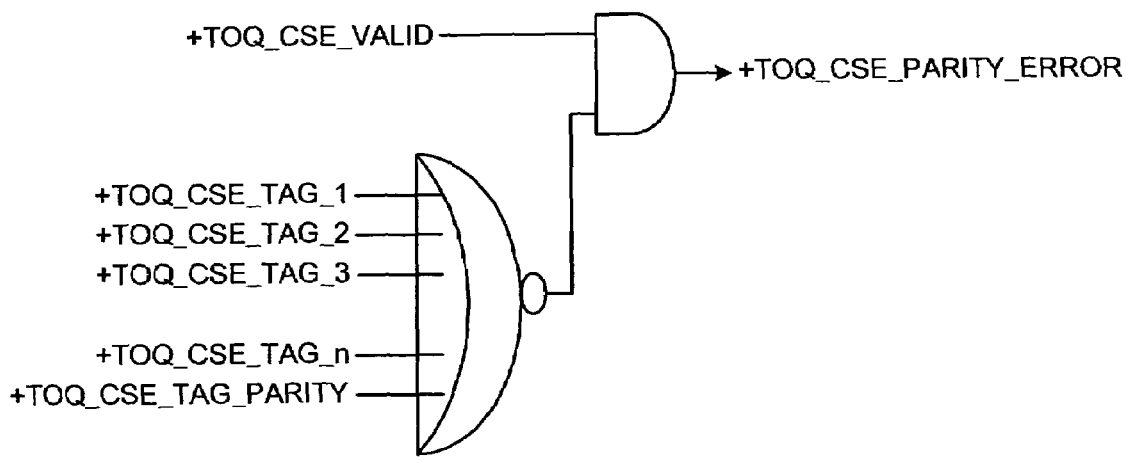
FIG. 6 is a block diagram of a configuration of a circuit that carries out a parity check of a TOQ entry of a completion target entry.

FIG. 6 is a block diagram of a configuration of a circuit that carries out a parity check of a TOQ entry of the completion target entry 211. As shown in FIG. 6, this circuit detects a parity error when a TOQ_CSE_VALID signal that indicates that valid data is set to the entry is on, and also when there is a parity error in the data registered in the entry. Similar circuits are present in other entries of the completion target entry 211.

Figure 7:
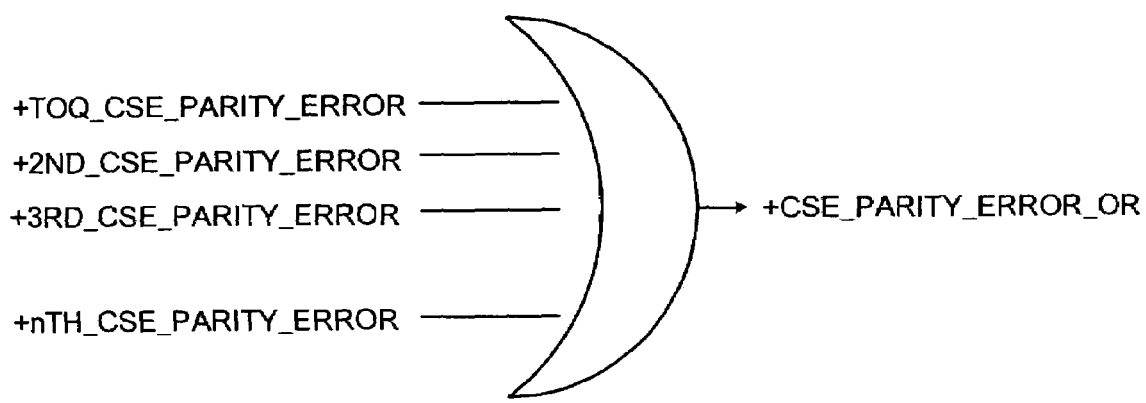
FIG. 7 is a block diagram of a configuration of a circuit that carries out a parity check of the completion target entry.

FIG. 7 is a block diagram of a configuration of a circuit that carries out a parity check of the completion target entry 211. As shown in FIG. 7, this circuit detects a parity error when the parity error occurs in any one of the entries of the completion target entry 211.

Figure 8:
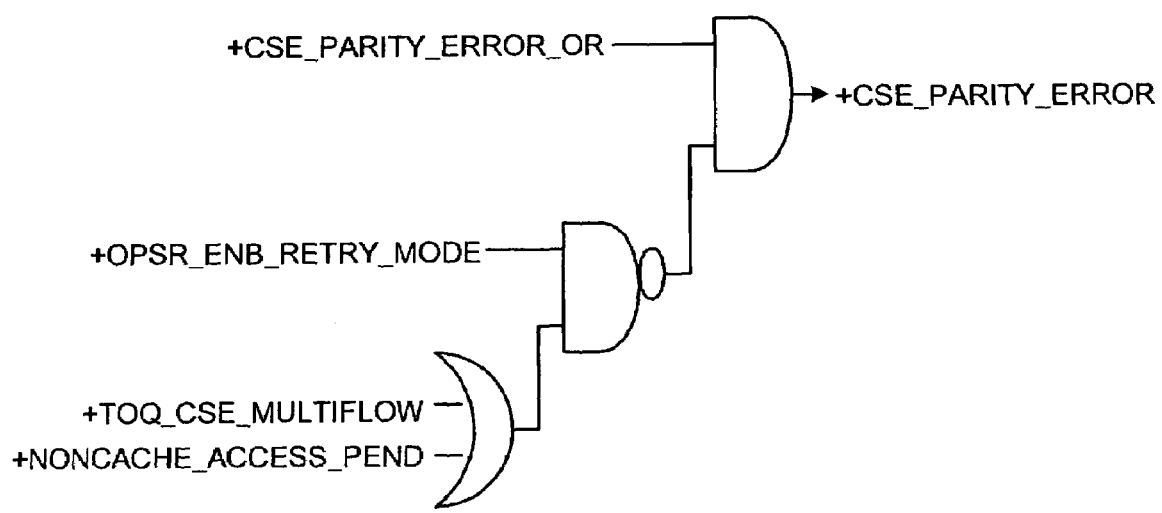
FIG. 8 is a block diagram of a configuration of a parity check circuit.

FIG. 8 is a block diagram of a configuration of the parity check circuit 205. As shown in FIG. 8, when an OPSR_ENB_RETRY_MODE signal that indicates that a verification of the operation of a command retry is being carried out is on, the circuit does not detect a parity error when any one of a TOQ_CSE_MULTIFLOW signal that indicates that the oldest command in the completion target entry 211 is a multi-flow command or a NONCACHE_ACCESS_PEND signal that indicates that a non-cache access command is present in the entry of the CSE 210 is on.

Timing when a command retry is not possible is not limited to the above examples, and other timing than the above examples can be present depending on the specification of the information processing apparatus. Even when the information processing apparatus cannot execute a command retry at timing other than the above one, the command-retry verification system according to the present embodiment can be applied to this information processing apparatus based on the provision of a mechanism of notifying the timing to the parity check circuit 205 like the above example.

The command retry mechanism 206 retries a command. Even when a trouble occurs in the information processing apparatus, this apparatus can normally continue the processing without stopping a program, based on the retry of the command by the command retry mechanism 206.

A resource updating circuit 207 releases each resource of a command of which execution the completion determining circuit 204 determines to have been completed, and an entry of the CSE 210.

The JTAG mechanism 208 checks operations of the information processing apparatus, has a check input/output interface. The retry verification system according to the present embodiment uses the JTAG mechanism 208 to switch between a mode of carrying out the verification of the operation of a command retry and a normal operation mode. Specifically, the ERROR_INJECTION signal and the OPSR_ENB_RETRY_MODE signal sent from the JTAG mechanism 208 are set on, to carry out the verification of the operation of a command retry. When a normal operation is carried out, these signals are set off.

The CSE 210 holds information concerning the command sent from the command decoder 104, in the entry. Each entry of the CSE 210 has a parity bit to detect a data error. The completion target entry 211 is a unit into which the completion target entry selecting circuit 203 transcribes information concerning a command having a possibility of being completed in the next cycle from the CSE 210.

Figure 9:
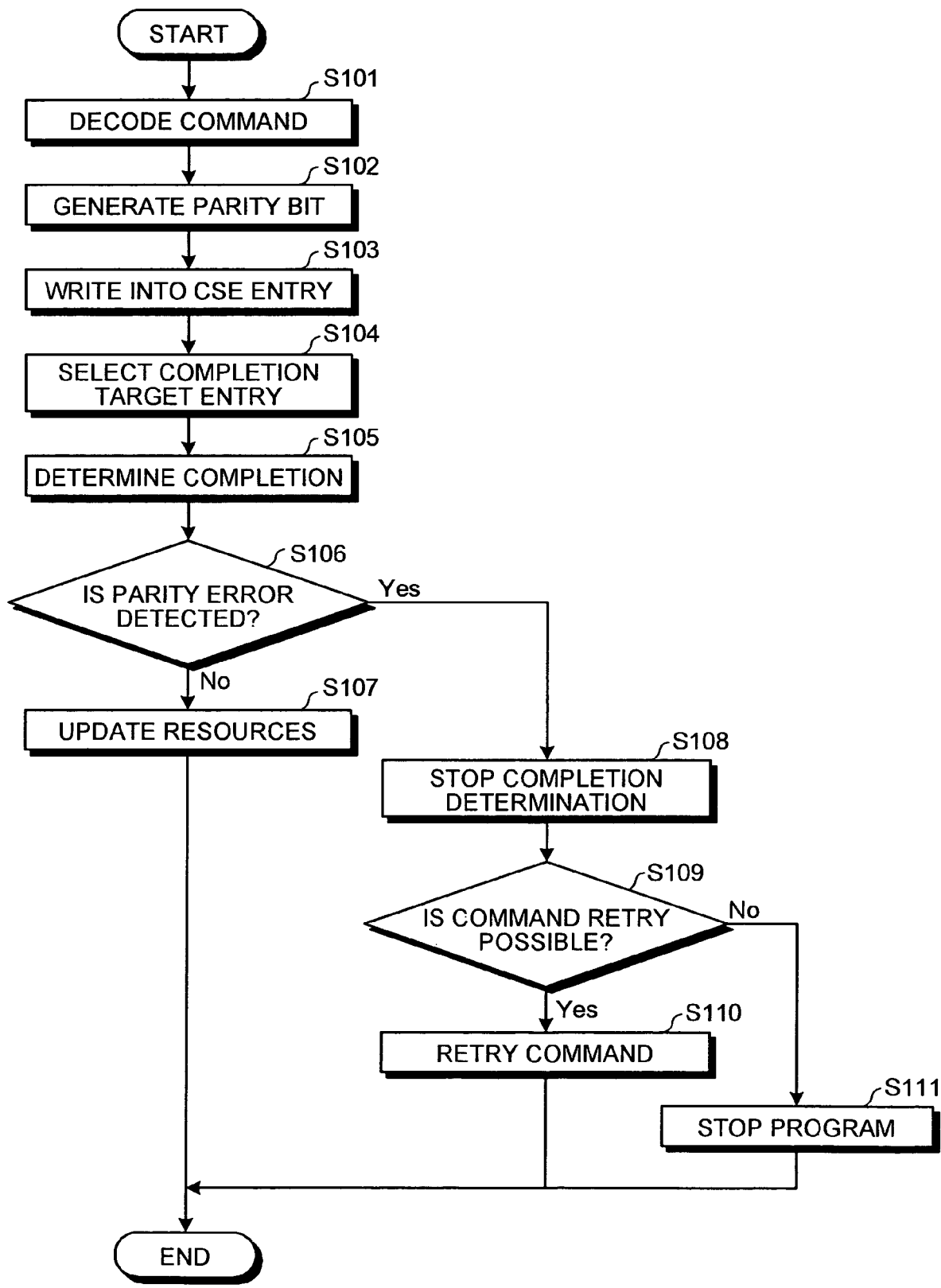
FIG. 9 is a flowchart of a processing procedure of a normal operation by the units shown in FIG. 4.

Processing procedures of a normal operation and a command-retry verification by the units shown in FIG. 4 will be explained below. FIG. 9 is a flowchart of the processing procedure of the normal operation by the units shown in FIG. 4.

As shown in FIG. 9, when the command decoder 104 decodes a command, and sends information concerning this command to the entry registering circuit 201 (step S101), the parity generating circuit 202 generates parity data corresponding to the sent information (step S102). The entry registering circuit 201 adds parity data to the sent information, and writes this information into the entry of the CSE 210 (step S103).

The completion target entry selecting circuit 203 selects an entry of a command of which execution has a possibility of being completed in the next cycle from among the entries of the CSE 210, and transcribes the entry to the completion target entry 211 (step S104). When the cycle is completed, the completion determining circuit 204 determines whether the execution of the command in each entry of the completion target entry 211 is completed (step S105).

When the completion target entry selecting circuit 203 makes a completion determination, the parity check circuit 205 carries out a parity check of the entry. When no parity error is detected in any entry (No at step S106), the resource updating circuit 207 updates resources of the command of which execution is completed, and releases the entry of the CSE (step S107).

When a parity error is detected in any entry (Yes at step S106), the completion determining circuit 204 stops a completion determination, and notifies the retry mechanism 206 about the detection of the parity error (step S108).

The command retry mechanism 206 retries commands starting from the oldest command to be completed. When the command retry is possible (Yes at step S109), the retry of the commands is successful (step S110). When the command retry is not possible (No at step S109), a program stops.

Figure 10:
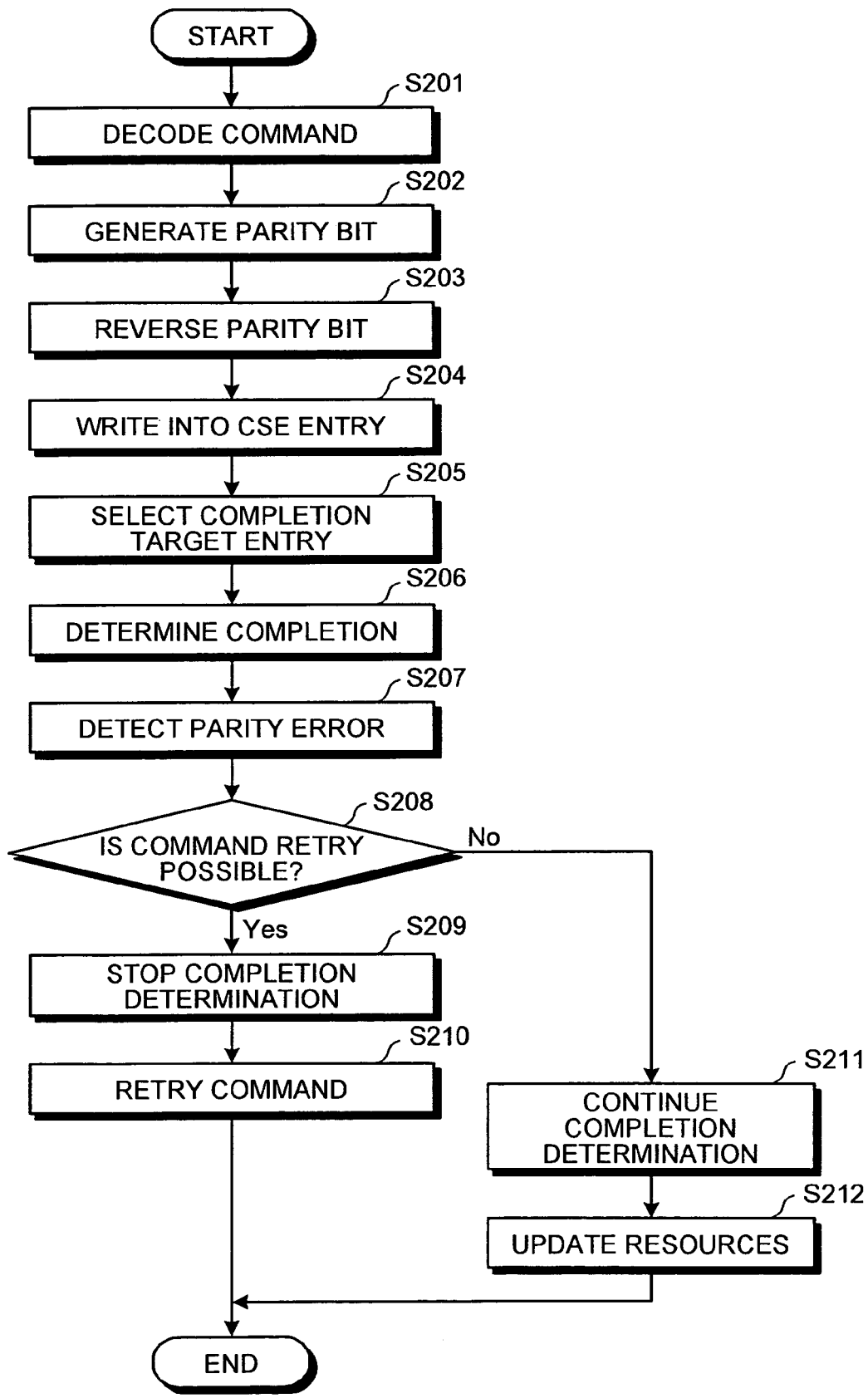
FIG. 10 is a flowchart of a processing procedure of a command-retry verification by the units shown in FIG. 4.

FIG. 10 is a flowchart of the processing procedure of the command-retry verification by the units shown in FIG. 4.

As shown in FIG. 10, the command decoder 104 decodes a command, and sends information concerning this command to the entry registering circuit 201 (step S201). The parity generating circuit 202 generates parity data corresponding to the sent information (step S202), and reverses the parity data to intentionally detect a parity error (step S203). The entry registering circuit 201 adds parity data to the sent information, and writes this information into the entry (step S204).

The completion target entry selecting circuit 203 selects an entry of a command of which execution has a possibility of being completed in the next cycle from among the entries of the CSE 210, and transcribes the entry to the completion target entry 211 (step S205). When the cycle is completed, the completion determining circuit 204 determines whether the execution of the command in each entry of the completion target entry 211 is completed (step S206).

When the completion target entry selecting circuit 203 makes a completion determination, the parity check circuit 205 carries out a parity check of the entry. Because the parity data is reversed at step S203, the parity error is detected (step S207).

When a command retry is possible (Yes at step S208), the parity error is detected straight. The completion determining circuit 204 stops a completion determination, and notifies the command retry mechanism 206 about the detection of the parity error (step S209). The command retry mechanism 206 retries commands starting from the oldest command to be completed.

When the command retry is not possible (No at step S208), the completion determination is continued by assuming that a parity error is not detected (step S211). The resource updating circuit 207 releases resources of the commands of which execution is completed and the entries of the CSE (step S212).

As described above, according to the present embodiment, a parity error of the CSE 210 is intentionally generated to execute a command retry. It is configured that, when the command retry and the verification of the operation are unsuccessful, no parity error is detected. Therefore, the command retry can be executed repeatedly, and consequently, the command retry can be verified sufficiently.

Furthermore, according to the present invention, the information processing apparatus intentionally generates a parity error of a commit stack entry when the information processing apparatus is in a verification state. With this arrangement, a command retry is executed. Therefore, there is an effect that by setting the information processing apparatus to a verification state, the command retry is repeatedly executed to verify the operation.

Moreover, according to the present invention, a parity error is generated by reversing a parity bit. Therefore, there is an effect that the information processing apparatus can execute a command retry without changing information that is necessary to carry out a normal operation.

Furthermore, according to the present invention, when the information processing apparatus is in a verification state, a command retry is not carried out at timing that the command retry cannot be executed. Therefore, there is an effect that even when the command retry cannot be executed, the operation verification can be continued without stopping a program.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information processing apparatus comprising:
a command retry mechanism that retries a command when an abnormality occurs;
a commit stack entry that holds information concerning commands to be executed out of order in an order of an original order to control the order of completing the commands;
a state setting circuit that sets a state of the information processing apparatus to either of a normal state for a normal operation or a verification state for an operation verification;
an entry registering circuit that tampers, when the information processing apparatus is in the verification state, contents of the information concerning a command to be registered to the commit stack entry, and registers the information in a state of detecting a parity error; and
a completion determining circuit that performs a determination of completion and a parity check of an entry of a command of which execution has a possibility of being completed in a corresponding cycle from among the entries of the commit stack entry, and when a parity error is detected in any one of the entries, requests the command retry mechanism to retry commands starting from an oldest command registered in the commit stack entry.

2. The information processing apparatus according to claim 1, wherein when the information processing apparatus is in the verification state, the entry registering circuit reverses the parity bit of data to be registered to the commit stack entry, and registers the data in a state that a parity error is detected.

3. The information processing apparatus according to claim 1, wherein
when a parity error is detected in the verification state of the information processing apparatus, the completion determining circuit requests the commit stack entry to retry commands, and
when the command retry mechanism detects a command to stop a program, the completion determining circuit does not request the command retry mechanism to retry commands, and continues the determination of completion by assuming that no parity error occurs.

4. The information processing apparatus according to claim 3, wherein
when a parity error is detected in the normal state of the information processing apparatus, the completion determining circuit requests the commit stack entry to retry commands, and
when the command retry mechanism detects a command to stop a program, the completion determining circuit requests the command retry mechanism to retry commands, and the command retry mechanism determines whether to carry out the command retry.

5. A command-retry verification method for an information processing apparatus including a command retry mechanism that retries a command when an abnormality occurs and a commit stack entry that holds information concerning commands to be executed out of order in an order of an original order to control the order of completing the commands, the command-retry verification method comprising:
registering the information in a state of detecting a parity error by tampering, when the information processing apparatus is in a verification state, contents of the information concerning a command to be registered to the commit stack entry;
performing a determination of completion and a parity check of an entry of a command of which execution has a possibility of being completed in a corresponding cycle from among the entries of the commit stack entry; and
requesting, when a parity error is detected in any one of the entries, the command retry mechanism to retry commands starting from an oldest command registered in the commit stack entry.

6. The command-retry verification method according to claim 5, wherein when the information processing apparatus is in the verification state, the registering includes
reversing the parity bit of data to be registered to the commit stack entry; and
registering the data in a state that a parity error is detected.

7. The command-retry verification method according to claim 5, wherein
  when a parity error is detected in the verification state of the information processing apparatus, the requesting includes requesting the commit stack entry to retry commands, and
  when the command retry mechanism detects a command to stop a program, the requesting includes continuing the performing by assuming that no parity error occurs without requesting the command retry mechanism to retry commands.

8. The command-retry verification method according to claim 7, wherein
  when a parity error is detected in a normal state of the information processing apparatus, the requesting includes requesting the commit stack entry to retry commands, and
  when the command retry mechanism detects a command to stop a program, the requesting includes requesting the command retry mechanism to retry commands, and the command retry mechanism determines whether to carry out the command retry.

9. An information processing apparatus comprising:
  a command-retry mechanism that retries a command when an abnormality occurs;
  a commit stack that holds entries of information concerning respective commands to be executed out of order, the entries of information being held in an original order, to control the order of completion of the commands;
  a state setting circuit that sets the information processing apparatus to either a normal state for normal operation or a verification state for a verification operation;
  an entry registering circuit that tampers with the entries of information and registers the entries of information in the commit stack so as to enable detecting a parity error, the entries of information being tampered with and registered in the verification state; and
  a completion determining circuit that determines if a command targeted for a cycle has been completed in the cycle and performs a parity check, the command being checked for completion using, and the parity check being performed on, the respective entry of information in the commit stack, such that when a parity error is detected in any one of the entries, the completion determining circuit requests the command retry mechanism to retry commands starting from a command associated with a respective oldest entry in the commit stack.

* * * * *